United States Patent
Mongia

(10) Patent No.: US 7,548,427 B2
(45) Date of Patent: Jun. 16, 2009

(54) APPARATUS AND DOCKING STATION FOR COOLING OF COMPUTING DEVICES

(75) Inventor: Rajiv K. Mongia, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 66 days.

(21) Appl. No.: 11/864,838

(22) Filed: Sep. 28, 2007

(65) Prior Publication Data

US 2009/0086433 A1    Apr. 2, 2009

(51) Int. Cl.
    *H05K 7/20* (2006.01)
(52) U.S. Cl. ............ 361/700; 361/695; 361/699; 174/15.2; 165/80.4; 165/104.26
(58) Field of Classification Search .......... None
    See application file for complete search history.

(56) References Cited

U.S. PATENT DOCUMENTS

| | | | |
|---|---|---|---|
| 6,038,128 A * | 3/2000 | Hood et al. ............ | 361/687 |
| 6,118,654 A * | 9/2000 | Bhatia ............ | 361/687 |
| 6,445,580 B1 * | 9/2002 | Cohen et al. ............ | 361/687 |
| 6,646,874 B2 | 11/2003 | Pokharna et al. | |
| 6,650,536 B2 * | 11/2003 | Lee et al. ............ | 361/687 |
| 7,113,399 B2 * | 9/2006 | Hisano et al. ............ | 361/688 |
| 7,191,820 B2 * | 3/2007 | Chou et al. ............ | 165/10 |

* cited by examiner

*Primary Examiner*—Boris L Chervinsky
(74) *Attorney, Agent, or Firm*—Kacvinsky LLC

(57) ABSTRACT

An apparatus with some embodiments is described having cooling capabilities for a computing device. In some embodiments, the apparatus may include a thermoelectric component (TEC) to transfer thermal energy with a first heat exchanger, through a heat attach and heat pipe, to or from the TEC, and then with a second heat exchanger. In some embodiments, the apparatus may include a second heat attach and a second heat pipe between the second heat exchanger and the TEC. Furthermore, in some embodiments, the apparatus may be at a docking station, where the docking station may connect with the computing device. Other embodiments are described.

14 Claims, 4 Drawing Sheets

APPARATUS AND DOCKING STATION FOR COOLING OF COMPUTING DEVICES

FIELD OF THE INVENTION

This invention relates to embodiments of docking stations for computing devices. More specifically, it relates to embodiments where the docking station provides for the cooling of computing devices.

BACKGROUND OF THE INVENTION

A computing device, such as a laptop computer or a notebook computer or other mobile electronic device often includes its own cooling solution, either active or passive. Some active cooling solutions use one or more computer fans driven from a battery of the computing device and provide a certain amount of cooling for a processor of the computing device. Thus, cooling solutions conform to practical constraints, including maintaining acceptable battery life, noise levels, and weight.

Computing devices can be engaged with a docking station. Because the docking station does not have to conform to these same constraints, the docking station can enhance the functionality of the computing device or provide additional features.

BRIEF DESCRIPTION OF THE DRAWINGS

Embodiments of the invention are described with reference to the accompanying drawings wherein.

DETAILED DESCRIPTION OF THE INVENTION

Figure 1:
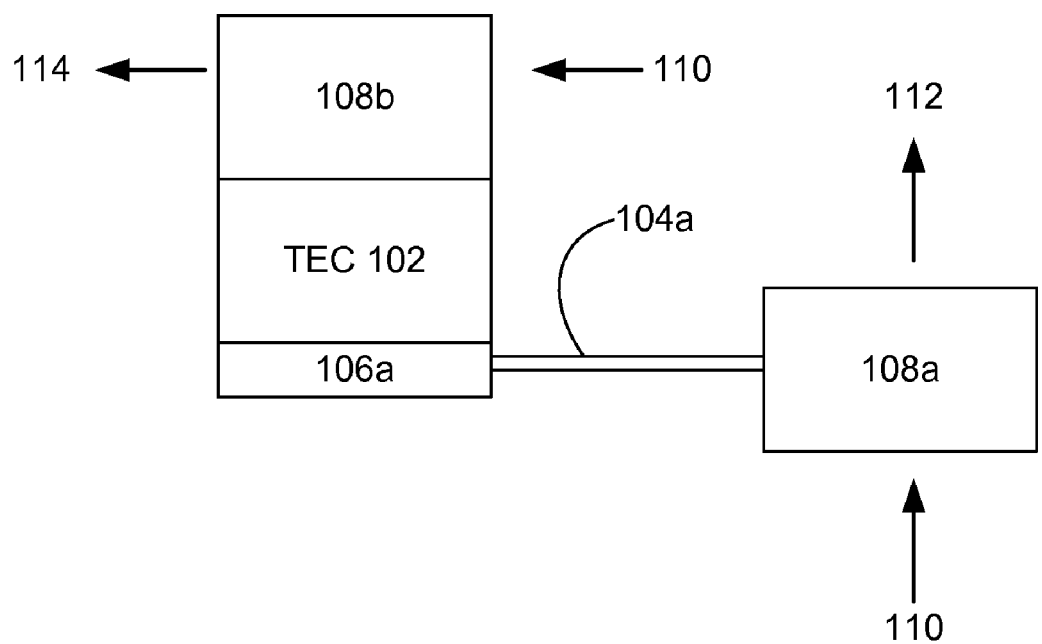
FIG. 1 is a block diagram of a thermoelectric cooling apparatus, according to some embodiments of the invention.

FIG. 1 is a block diagram of a thermoelectric cooling apparatus 100, according to some embodiments of the invention. The apparatus 100 may include a thermoelectric component (TEC) 102 to transfer thermal energy when an electric current is applied to the TEC 102. In some embodiments, the TEC 102 may be made of a material or composition, which is thermally conductive and electrically insulating, such as aluminum oxide or semiconductor material. TEC's operate based on the Peltier effect, which, as one of ordinary skill in the relevant art would appreciate based at least on the teachings described herein, includes sending a current through the component to produce a temperature difference between either side on the TEC 102. Thus, the TEC 102 can transport thermal energy, or heat, away from the hot side.

In some embodiments, the apparatus 100 includes a first heat attach 106a which may be coupled to the TEC 102 to allow for the transfer of thermal energy through the TEC 102, and a first heat pipe 104a which may be coupled through the first heat attach 106a to allow for the transfer of thermal energy through the first heat attach 106a. The heat pipe 104a, as well as the other heat pipes described herein, may include a wicking layer on an internal surface.

A fluid in the heat pipe can condense on the wicking layer when it is cooled and evaporates from the wicking layer when it is heated. As the fluid evaporates from the wicking layer, the vaporized fluid will then flow through the heat pipe to the other end where is may condense. According to some embodiments, the utilization of one or more heat pipes between the heat exchanger and the TEC 102 provides for a thinner profile and/or remote cooling within the docking stations described herein.

A first heat exchanger 108a may be coupled to the first heat pipe 104a to allow for the transfer thermal energy through the first heat pipe 104a, according to some embodiments of the invention. The first heat exchanger 108a may receive thermal energy from an incoming airflow, such as first airflow 110, and may cool it to provide an outgoing airflow, such as a second airflow 112. In some embodiments, the airflows may be supplied by a fan, a jet, a membrane, or similar air mover, as one of ordinary skill in the relevant art would appreciate based at least on the teachings provided herein. A second heat exchanger 108b may be coupled to the TEC 102 to dissipate thermal energy from the TEC 102, wherein the second heat exchanger 108b may dissipate thermal energy into an incoming airflow, such as airflow 110, to produce an outgoing airflow, such as a third airflow 114.

In some embodiments of the invention, a second airflow 112 may be a lower temperature than the first airflow 110, and/or the third airflow 114. In other embodiments, a second airflow 112 may be a higher temperature than the first airflow 110, and/or a third airflow 114. As one of ordinary skill in the relevant art would appreciate based at least on the teachings described herein, the heat exchangers may include various surface features, such as but not limited to fin arrangements. In some embodiments, the first heat exchanger 108a may transfer thermal energy to the first airflow 110, and may dissipate the heat being transferred by the TEC 102. While the second heat exchanger 108b may receive thermal energy from the first airflow 110, and may cool the airflow 100 and provide the third airflow 114. In this embodiment, the second airflow 112 may be a higher temperature than the first airflow 110; and the third airflow 114 may be a lower temperature than the first airflow 110.

Figure 2:
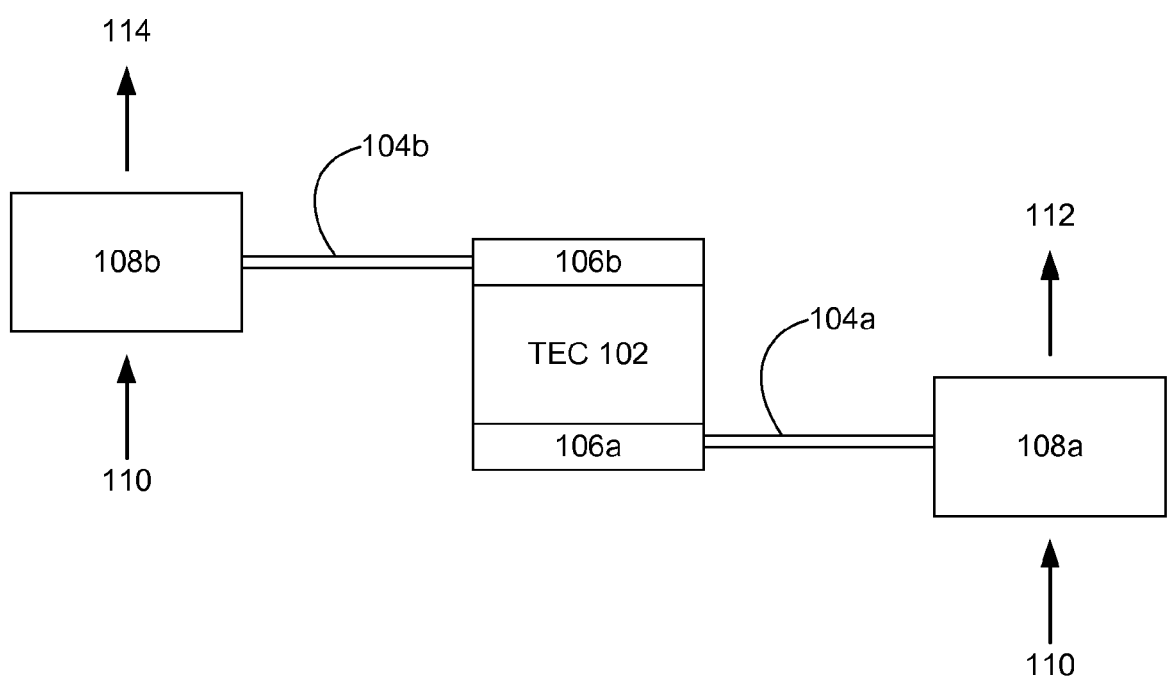
FIG. 2 is a block diagram of another thermoelectric cooling, apparatus according to some embodiments of the invention.

FIG. 2 is a block diagram of a thermoelectric cooling apparatus 200, according to some embodiments of the invention. The apparatus 200 includes the components of apparatus 100, with the addition of a second heat attach 106b, which may be coupled to the TEC 102 to allow for the transfer of thermal energy through the TEC 102, and a second heat pipe 104b which may be coupled to the second heat attach 106b to allow for the transfer of thermal energy through the second heat attach 106b, wherein the second heat exchanger 108b is coupled to the second heat pipe 104b instead of the TEC 102.

In some embodiments of the apparatuses 100 and/or 200, the electric current may be changed to one or more preset levels within an operating range. As one of ordinary skill in the relevant art would appreciate based at least on the teachings described herein, the operating range may be determined by the size, composition, or desired temperature differential; and the one or more preset levels may be at any percentage of maximum current. In some embodiments, the one or more preset levels are based on the amount of thermal energy to be transferred between the sides of the TEC 102.

In some embodiments, the one or more preset levels of the electric current may be determined by a computing device or a docking station, such as but not limited to the computing devices 304 and 404, and docking stations 300 and 400 described below with respect to FIGS. 3 and 4.

In FIG. 2, the apparatus 200 uses heat pipes 104 on each side of the TEC 102. In FIG. 1, the apparatus 100 uses a heat pipe 104 on one side of the TEC 102. In some embodiments, more than one heat pipe 104 may be used on either side of the TEC 102. In some embodiments, the heat pipes 104 may be used on either the hot side of the cold side of the TEC 102, as described previously with respect to embodiments of the invention; but it may be preferable to at least use the heat pipe on the cold side.

Figure 3:
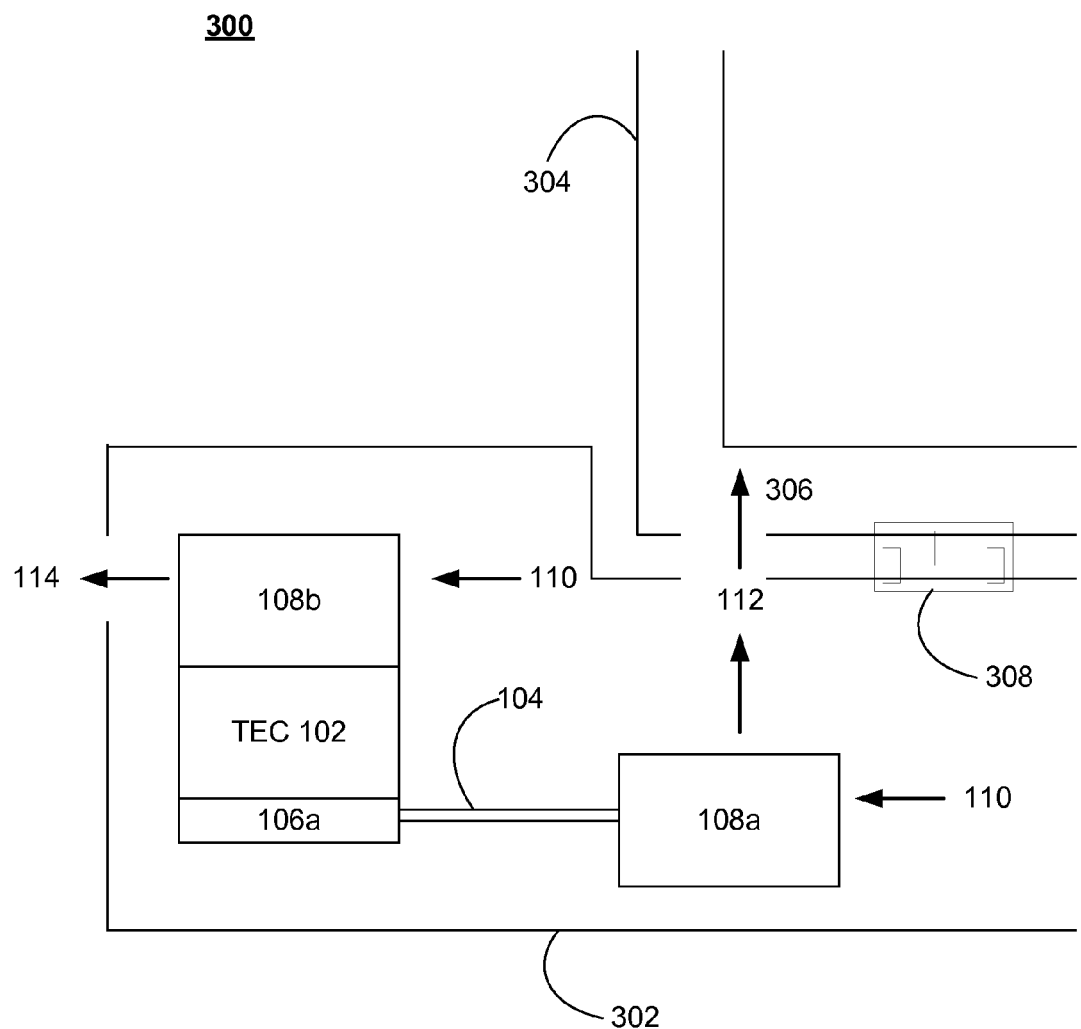
FIG. 3 is a block diagram of a docking station with thermoelectric cooling apparatus, according to some embodiments of the invention.

FIG. 3 is a block diagram of a docking station 300 with thermoelectric cooling apparatus, according to some embodiments of the invention. The docking station 300 may include a housing 302 to provide for one or more airflows, such as but not limited to airflows 110, 112, and/or 114. Furthermore, in some embodiments, a docking station engager 308 at the housing 302 may engage a connection between the docking station 300 and a computing device 304; and an apparatus, such as but not limited to apparatus 100 (shown) or 200, at the housing 302 to provide cooling to the computing device 304 when engaged with the docking station 300.

Figure 4:
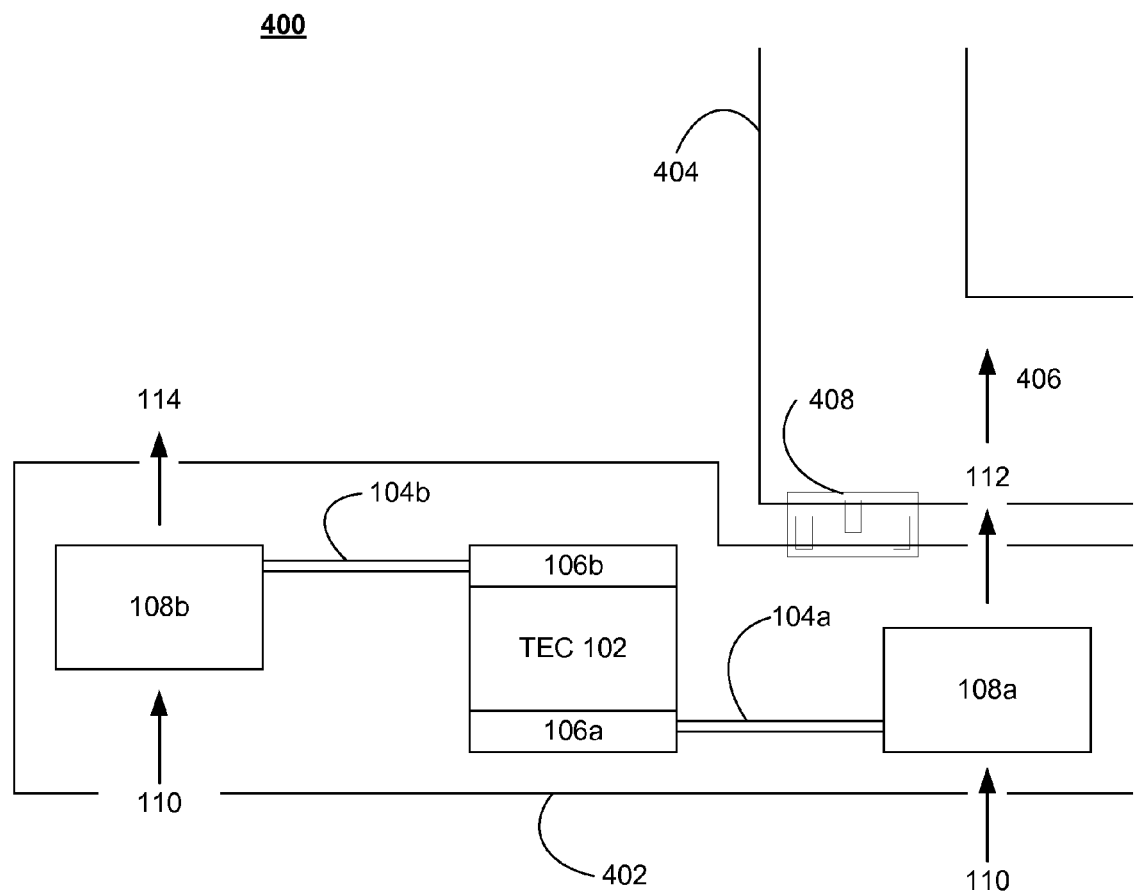
FIG. 4 is a block diagram of another docking station with another thermoelectric cooling apparatus, according to some embodiments of the invention.

FIG. 4 is a block diagram of a docking station 400 with another thermoelectric cooling apparatus, such as but not limited to apparatus 100 or 200 (shown) according to some embodiments of the invention. In some embodiments, the docking station 400 may include a housing 402 with a docking station engager 408, where both may operate in a similar manner as the housing and engager of FIG. 3.

According to some embodiments of the invention, in the docking stations 300 and/or 400, the apparatus may provide airflows, such as the second airflow 112, to the computing device, such as devices 304 or 404. The second airflow 112 may enter the computing device and provide a cooling. As one of ordinary skill in the relevant art would appreciate based at least on the teachings described herein, the airflows may pass between the housings via one or more vents or similar openings in the housings.

In some embodiments, the engagers 308 and/or 408 may have a recessed shape with a substantially rectangular or circular periphery on the computing device, which may be complimentary to a protruding shape on the docking station. In some embodiments, the engagers may be have both recessed and protruding shapes on both the device and the station, as is indicated in FIGS. 3 and 4. As such, the engagers may be aligned to thus provide alignment of the airflows.

According to some embodiments of the invention, the TEC 102 may be provided electric current via one or more cables (not shown) in the docking station 300 or 400. Power may be provided via the cables may be adjusted via controls (not shown) on the docking station and/or the computing device 304 or 404, as one of ordinary skill in the relevant art would appreciate based at least on the teachings provided herein. When current is applied to the TEC 102, it may flow through the TEC 102 in a direction from the hotter side to the cooler side, in some embodiments of the invention. The current through the TEC 102 thus causes thermal energy to be transferred from the cold side to the hot side.

While some exemplary embodiments have been described and shown in the accompanying drawings, it is to be understood that these embodiments are illustrative and not restrictive of the invention. The invention is not restricted to specific constructions and arrangements, such as those shown and described. Modifications to the embodiments of the invention may be possible, as one of ordinary skill in the relevant art would appreciate based at least on the teachings described herein. For example, the apparatus described herein may be implemented in other than a docking station and may be used in a similar manner to provide cooling or enhanced cooling to a computing device.

What is claimed:

1. An apparatus comprising:
    a thermoelectric component to transfer thermal energy when an electric current is applied to the thermoelectric component;
    a first heat attach coupled to the thermoelectric component to allow for the transfer of thermal energy through the thermoelectric component;
    a first heat pipe coupled to the first heat attach to allow for the transfer of thermal energy through the first heat attach;
    a first heat exchanger coupled to the first heat pipe to allow for the transfer thermal energy through the first heat pipe, wherein the first heat exchanger can receive thermal energy from a first airflow and produce a second airflow; and
    a second heat exchanger coupled to the thermoelectric component to receive thermal energy from the thermoelectric component, wherein the second heat exchanger can dissipate thermal energy to a third airflow.

2. The apparatus of claim 1, further comprising:
    a second heat attach coupled to the thermoelectric component to allow for the transfer of thermal energy through the thermoelectric component; and
    a second heat pipe coupled to the second heat attach to allow for the transfer of thermal energy through the second heat attach, wherein the second heat exchanger is coupled to the second heat pipe instead of the thermoelectric component.

3. The apparatus of claim 1, wherein the electric current is changed to one or more preset levels within an operating range.

4. The apparatus of claim 3, wherein the one or more preset levels are based on the amount of thermal energy to be transferred and the operating range is based on the thermoelectric component.

5. The apparatus of claim 3, wherein the one or more preset levels of the electric current is determined by a computing device or a docking station.

6. The apparatus of claim 1, wherein the thermoelectric component is at least partially made of a semiconductor material.

7. The apparatus of claim 1, wherein the second airflow is a lower temperature than the third airflow.

8. A docking station, comprising:
    a housing to provide for one or more airflows;
    a docking station engager at the housing to engage a connection between the docking station and a computing device; and
    an apparatus at the housing to provide cooling to the computing device when engaged with the docking station, wherein the apparatus includes a thermoelectric component to transfer thermal energy when an electric current is applied to the thermoelectric component;
    a first heat attach coupled to the thermoelectric component to allow for the transfer of thermal energy through the thermoelectric component;
    a first heat pipe coupled to the first heat attach to allow for the transfer of thermal energy through the first heat attach;
    a first heat exchanger coupled to the first heat pipe to allow for the transfer thermal energy through the first heat pipe, wherein the first heat exchanger can receive thermal energy from a first airflow and produce a second airflow; and a second heat exchanger coupled to the thermoelectric component to receive thermal energy from the thermoelectric component, wherein the second heat exchanger can dissipate thermal energy to a third airflow.

9. The docking station of claim 8, wherein the apparatus further comprises:

a second heat attach coupled to the thermoelectric component to allow for the transfer of thermal energy through the thermoelectric component; and a second heat pipe coupled to the second heat attach to allow for the transfer of thermal energy through the second heat attach, wherein the second heat exchanger is coupled to the second heat pipe instead of the thermoelectric component.

10. The docking station of claim 8, wherein the thermoelectric component is at least partially made of a semiconductor material.

11. The docking station of claim 8, wherein the second airflow is a lower temperature than the third airflow.

12. An apparatus comprising:

a thermoelectric component to transfer thermal energy when an electric current is applied to the thermoelectric component;

a first heat attach coupled to the thermoelectric component to allow for the transfer of thermal energy through the thermoelectric component;

a first heat pipe coupled to the first heat attach to allow for the transfer of thermal energy through the first heat attach;

a first heat exchanger coupled to the first heat pipe to allow for the transfer thermal energy through the first heat pipe, wherein the first heat exchanger can dissipate thermal energy to a first airflow and produce a second airflow; and a second heat exchanger coupled to the thermoelectric component to transfer thermal energy to the thermoelectric component, wherein the second heat exchanger can receive thermal energy from a third airflow.

13. The apparatus of claim 12, wherein the second airflow is a higher temperature than the third airflow.

14. The apparatus of claim 13, wherein the apparatus is located within a docking station.

\* \* \* \* \*